United States Patent
House (10) Patent No.: US 7,466,832 B2
(45) Date of Patent: Dec. 16, 2008

(54) SEATBACK AUDIO CONTROLLER

(75) Inventor: William Neal House, Greenwood, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 1172 days.

(21) Appl. No.: 10/631,187

(22) Filed: Jul. 31, 2003

(65) Prior Publication Data

US 2004/0021351 A1 Feb. 5, 2004

Related U.S. Application Data (60) Provisional application No. 60/400,369, filed on Jul. 31, 2002.

(51) Int. Cl.
*H03G 3/00* (2006.01)

(52) U.S. Cl. .................. 381/107; 381/123; 381/57; 381/86

(58) Field of Classification Search ............... 381/86, 381/57, 123, 302, 104, 107; 700/94; 455/133; 340/825.24; 307/10.1; 701/36
See application file for complete search history.

(56) References Cited

U.S. PATENT DOCUMENTS

| | | | |
|---|---|---|---|
| 2,452,103 A | 10/1948 | Conradt et al. |
| 2,501,993 A | 3/1950 | Conradt |
| 2,527,656 A | 10/1950 | Reinsdorf |
| 2,710,662 A | 6/1955 | Camras |
| 2,802,906 A | 8/1957 | Goldenberg et al. |
| 2,908,766 A | 10/1959 | Taylor |
| 3,156,500 A | 11/1964 | Kerr |
| 3,385,393 A | 5/1968 | Gold |
| 3,512,605 A | 5/1970 | McCorkle |
| 3,556,088 A | 1/1971 | Leonardini |
| 3,880,152 A | 4/1975 | Nohmura |
| 3,918,551 A | 11/1975 | Rizo-Patron |
| 3,944,020 A | 3/1976 | Brown |
| 3,976,162 A | 8/1976 | Cummings |
| 4,020,284 A | 4/1977 | Phillips |
| 4,023,566 A | 5/1977 | Martinmaas |
| 4,025,724 A | 5/1977 | Davidson, Jr. et al. |
| 4,027,112 A | 5/1977 | Heppner et al. |
| 4,038,499 A | 7/1977 | Yeaple |

(Continued)

FOREIGN PATENT DOCUMENTS

DE 198 40 444 A1 5/1999

(Continued)

*Primary Examiner*—Suhan Ni
*Assistant Examiner*—Jason Kurr
(74) *Attorney, Agent, or Firm*—Brinks Hofer Gilson & Lione (57) ABSTRACT

A vehicle seatback audio controller includes an entertainment interface that receives an entertainment audio signal from entertainment audio source, and a telematics interface that receives a telematics audio signal from a telematics audio source. The controller has an output that provides either the telematics audio signal to a seatback speaker when the telematics audio source is active or the entertainment audio signal to the seatback speaker when the telematics audio source is inactive. The controller may include an accelerometer or a microphone that generates a vibration signal and/or a noise signal. A level detector may receive the vibration signal and/or a noise signal, and adjust a level of the telematics audio signal to the seatback speaker as a function of the vibration signal and/or a noise signal.

24 Claims, 4 Drawing Sheets

U.S. PATENT DOCUMENTS

| | | |
|---|---|---|
| 4,042,791 A | 8/1977 | Wiseman |
| 4,055,170 A | 10/1977 | Nohmura |
| 4,061,877 A | 12/1977 | Phillips |
| 4,064,376 A | 12/1977 | Yamada |
| 4,075,438 A | 2/1978 | Kappel |
| 4,124,249 A | 11/1978 | Abbeloos |
| 4,156,117 A | 5/1979 | Phillips |
| 4,210,784 A | 7/1980 | Phillips |
| 4,289,936 A | 9/1981 | Civitello |
| 4,310,307 A | 1/1982 | Bellisario |
| 4,347,510 A * | 8/1982 | Ishigaki et al. .............. 381/123 |
| 4,440,443 A | 4/1984 | Nordskog |
| 4,490,842 A | 12/1984 | Watanabe |
| D277,630 S | 2/1985 | Olson et al. |
| 4,565,405 A | 1/1986 | Mayer |
| 4,638,884 A | 1/1987 | Lee |
| 4,641,345 A | 2/1987 | Takahashi |
| 4,696,370 A | 9/1987 | Tokumo et al. |
| 4,758,047 A | 7/1988 | Hennington |
| 4,778,027 A | 10/1988 | Taylor |
| 4,797,934 A | 1/1989 | Hufnagel |
| 4,866,687 A | 9/1989 | Kasai et al. |
| 4,877,105 A | 10/1989 | Mugikura |
| 4,979,777 A | 12/1990 | Takada |
| 4,991,222 A | 2/1991 | Nixdorf |
| 5,101,810 A | 4/1992 | Skille et al. |
| 5,113,852 A | 5/1992 | Murtonen |
| 5,143,055 A | 9/1992 | Eakin |
| 5,147,109 A | 9/1992 | Jolly |
| 5,191,177 A | 3/1993 | Chi |
| 5,193,118 A | 3/1993 | Latham-Brown et al. |
| 5,199,075 A | 3/1993 | Fosgate |
| 5,243,640 A * | 9/1993 | Hadley et al. ............ 455/426.1 |
| 5,301,237 A | 4/1994 | Fosgate |
| 5,314,403 A | 5/1994 | Shaw |
| 5,318,340 A | 6/1994 | Henry ...................... 297/232 |
| 5,387,026 A | 2/1995 | Matsuhashi et al. |
| 5,398,992 A | 3/1995 | Daniels |
| D361,674 S | 8/1995 | Carter, Sr. |
| 5,482,352 A | 1/1996 | Leal et al. |
| 5,608,806 A | 3/1997 | Hinojosa |
| 5,687,246 A | 11/1997 | Lancon |
| 5,692,058 A * | 11/1997 | Eggers et al. ............... 381/107 |
| 5,748,748 A * | 5/1998 | Fischer et al. ............. 381/71.4 |
| 5,844,992 A * | 12/1998 | Boyer ......................... 381/57 |
| 5,910,996 A * | 6/1999 | Eggers et al. ............... 381/107 |
| 6,360,187 B1 * | 3/2002 | Hermann .................... 702/191 |
| 6,681,024 B2 * | 1/2004 | Klein et al. ................. 381/389 |
| 6,991,289 B2 | 1/2006 | House ..................... 297/217.4 |
| 2003/0026440 A1 * | 2/2003 | Lazzeroni et al. ............. 381/86 |

FOREIGN PATENT DOCUMENTS

| | | |
|---|---|---|
| EP | 0 993 230 A2 | 4/2000 |
| JP | 1995-246689 A | 10/1995 |

\* cited by examiner

SEATBACK AUDIO CONTROLLER

This application claims the benefit of U.S. Provisional Application No. 60/400,369 filed Jul. 31, 2002. The disclosure of the above application is incorporated herein by reference.

BACKGROUND OF THE INVENTION

1. Technical Field

This invention relates to an audio system, and more particularly, to an audio controller that may be used with a seatback speaker.

2. Related Art

Speakers mounted in a vehicle seatback convert electrical signals into sound. The sound may provide entertainment through music or provide information through instructions or directions. In some speaker systems, it may be desirable to receive sound through a direct path to the front of a listener. The sound may use two or more separate channels that give the sound a more natural distribution.

It is also desirable to filter, mix, or switch audio signals that are converted into sound through a seatback speaker. These signals may be used in a navigation system in which only a driver may need to hear navigational instructions. Such a system may enable a listener to hear a signal clearly without interfering with the sounds heard by other listeners.

SUMMARY

A vehicle seatback audio controller controls an audio signal to one or more seatback speakers. The controller includes an entertainment interface that receives an entertainment audio signal from an entertainment source and a telematics interface that receives a telematics audio signal from a telematics audio source. The controller also has an output that provides the telematics audio signal to a seatback speaker when the telematics audio source is active. When the telematics audio source is inactive, the controller provides an entertainment audio signal to the seatback speaker.

The vehicle seatback audio controller may include an accelerometer or a microphone that may generate an audible oscillation or a noise signal. A level detector may receive the audible oscillation signal, a vibration signal, or the noise signal. The level detector may adjust a level of the telematics audio signal to the seatback speaker as a function of the oscillation signal, the vibration signal and/or the noise signal.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

First Seatback Audio Controller

Figure 1:
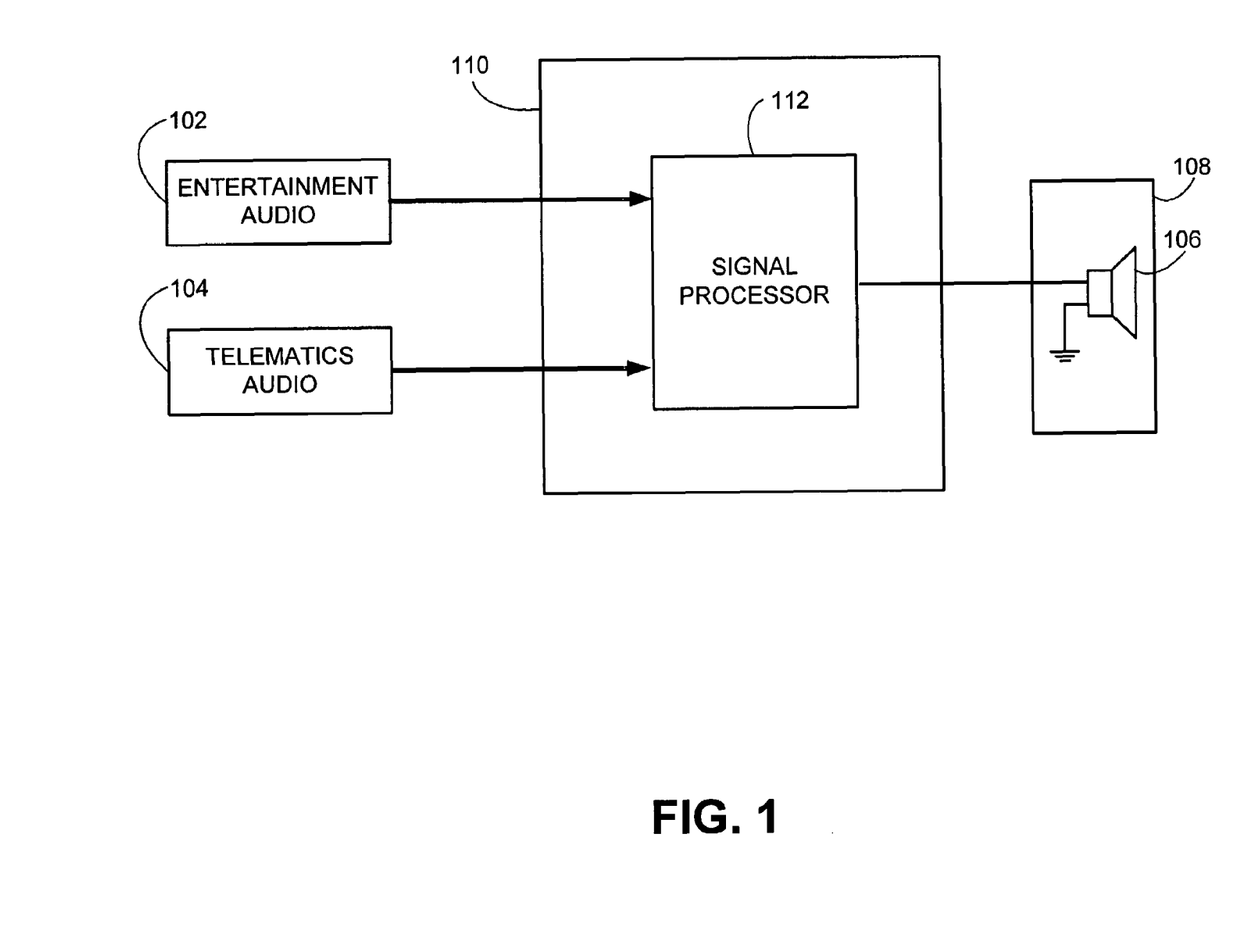
FIG. 1 is a seatback audio controller connected to multiple sources and a speaker.

An illustrative seatback audio controller 110 is shown in FIG. 1. The seatback audio controller 110 may be configured to accept an entertainment audio signal from an entertainment audio source 102 and a telematics audio signal from a telematics audio source 104. The seatback audio controller 110 generates an electrical signal that drives a seatback speaker 106, which is coupled to a seat 108. The seat 108 may be a driver's seat or a passenger seat within an automobile.

The entertainment audio source 102 may include a terrestrial or satellite radio receiver, a cassette tape player, a compact disc player ("CD player"), a minidisk player ("MD player"), an eight-track tape player, a digital audio tape player ("DAT player"), a digital versatile disc player ("DVD player"), an MPEG layer 3 audio player ("MP3 player) or other devices that provide an audio signal. The telematics source 104 may be a vehicle navigation system, a radar warning system, an altimeter, a mobile telephone, a weather radio, or another vehicle system that provides information. When the telematics audio signal from the telematics audio source 104 is below a threshold level, the telematics audio source 104 is inactive.

The seatback audio controller 110 may include a signal processor 112 capable of receiving or manipulating a plurality of audio signals. For example, when the telematics audio source 104 is active, the seatback audio controller 110 may transfer the signal from the telematics audio source 104 to the seatback speaker 106. When the telematics audio source 104 is inactive, the seatback audio controller 110 may transfer the entrainment audio signal from the entertainment source 102 to the seatback speaker 106. The entertainment and telematics signals may be mutually exclusive, so that at a given time only the entrainment audio signal or the telematics audio signal is sent by the seatback audio controller 110 and received by the seatback speaker 106. As a result, a vehicle passenger positioned in a driver or passenger seat 108 may hear the telematics audio more clearly.

Second Seatback Audio Controller

Figure 2:
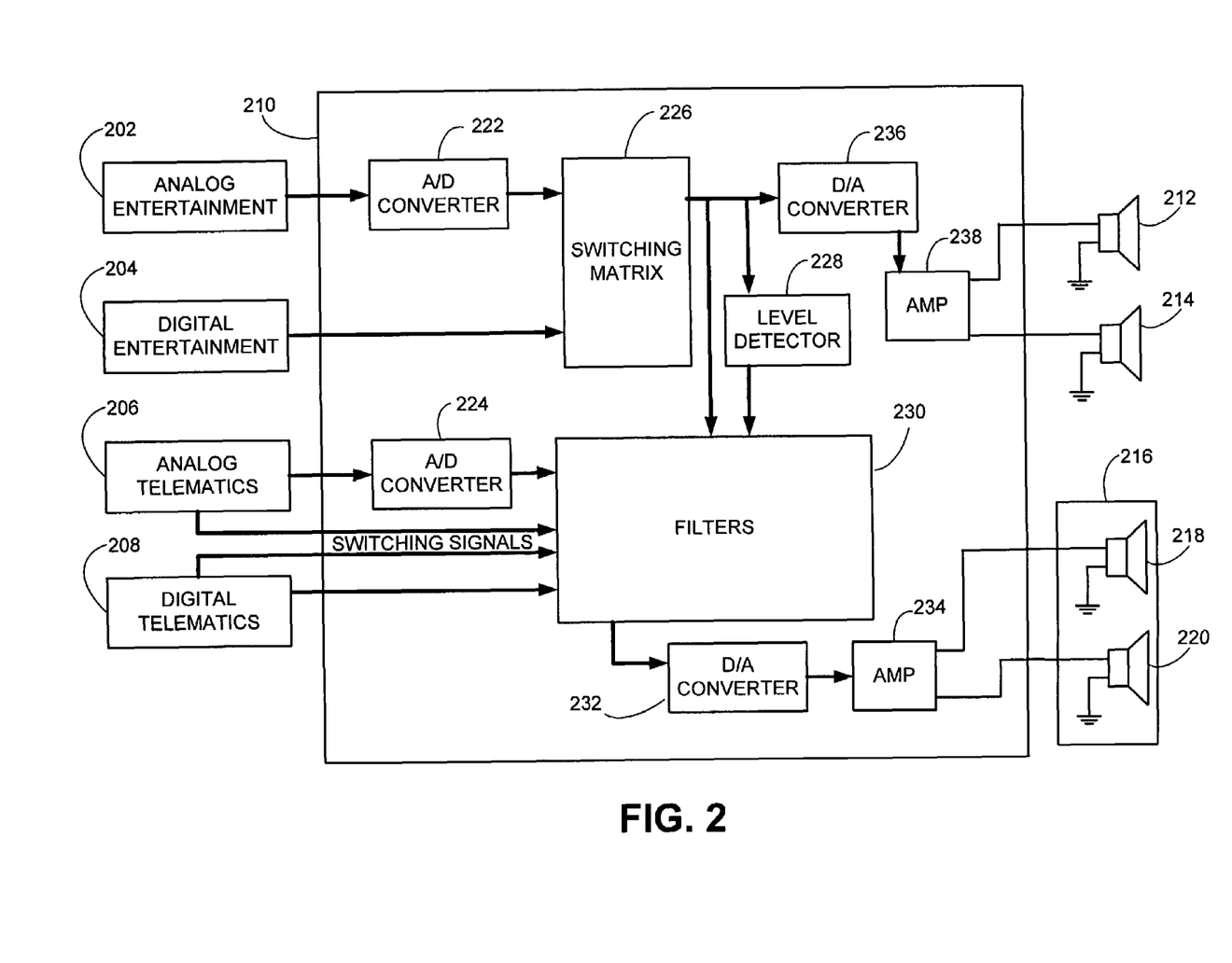
FIG. 2 is a second seatback audio controller connected to multiple sources and multiple speakers.

A second illustrative seatback audio controller 210 is shown in FIG. 2. The seatback audio controller 210 may be configured to accept input signals from an analog entertainment source 202, from a digital entertainment source 204, from an analog telematics source 206, and/or from a digital telematics source 208. The analog entertainment source 202 may be similar to the entertainment source 102 shown in FIG. 1 that is capable of providing an analog audio output.

The digital entertainment source 204 may include a CD player, an MD player, DAT player, a DVD player, an MP3 player, a digital radio receiver, or a similar device that is capable of generating a digital audio output. For example, the digital entertainment source 204 may provide an optical Toshiba® Link ("TOSLINK®") and/or an electrical Sony®/Phillips® digital interface ("S/PDIF") pulse-code modulated ("PCM"), a digital theater systems ("DTS®"), or a Dolby® Digital signal. The digital entertainment source 204 may also provide a digital audio signal through a wide area or local area network, such as a COBRANet® network, an Ethernet® network, a universal serial bus ("USB®") network, or other types of wired or wireless networks.

The analog telematics source 206 may be a vehicle navigation system, a radar warning system, an altimeter, a mobile telephone, a weather radio, or the like. The digital telematics source 208 may be an information system that provides a digital audio signal like those sources described above.

The seatback audio controller 210 may be configured to provide output signals to a right seatback speaker 218 and a left seatback speaker 220, each of which is coupled to a seat 216. The seatback audio controller 210 may also be configured to provide output signals to a right vehicle speaker 212 and a left vehicle speaker 214.

The seatback audio controller 210 may include analog-to-digital converters ("A/D converters") 222 and 224, a switching matrix 226, a level detector 228, filters 230, digital-to-analog converters ("D/A converters") 232 and 236, and amplifiers 234 and 238. The A/D converters 222 and 224 may be a device that translates a continuously varying (analog) signal, such as a voltage, to a succession of discrete digital values. Each A/D converter 222 and 224 may sample an audio signal at 44.1 KHz or above and produce an 8-bit, to 24-bit number representing the amplitude of the audio signal for each sample. The D/A converters 232 and 236, may be a device that translates digital data to an analog signal. The D/A converters 232 and 236, may receive a succession of discrete digital values as an input and create an analog signal whose amplitude corresponds to each digital value in time.

The switching matrix 226 may be a switch capable of receiving multiple digital audio input signals and providing a selected one of those digital audio signals as an output signal. The level detector 228 may be an integrator and/or a detector having a time constant significantly greater than a sampling rate of either of the A/D converters 222 and 224, for example 500 to 1,000 milliseconds. The filters 230 may be a digital signal processor ("DSP") capable of receiving a plurality of digital audio signals and one or more control signals, and altering and/or switching between the digital audio signals either as a function of the control signals, or in a predetermined fashion. The amplifiers 234 and 238 may be audio amplifiers capable of receiving an analog audio signal, such as a line-level signal, and amplifying it to a level sufficient to drive speakers. For example, the amplifiers 234 and 238 may be automotive stereo amplifiers.

In FIG. 2, the analog entertainment source 202 transmits an analog audio signal to the A/D converter 222. The A/D converter 222 converts the analog audio signal to a digital audio signal, and transmits the digital audio signal to the switching matrix 226. The digital entertainment source 202 transmits a digital audio signal directly to the switching matrix 226. The analog audio signal and the digital audio signal may each be a monophonic, stereophonic, or multi-channel audio signal.

The switching matrix 226 receives the audio signals from the digital entertainment source 202 and/or the A/D converter 222. One of these audio signals is selected, for example by a control signal (not shown), and transmitted by the switching matrix 226 as an entertainment audio signal to the D/A converter 236, the level detector 228, and the filters 230. The D/A converter 236 converts the digital entertainment audio signal to an analog audio signal. The analog entertainment audio signal is sent by the D/A converter 236 to the amplifier 238, which amplifies the entertainment audio signal to drive the vehicle speakers 212 and 214.

The level detector 228 may rectify the entertainment audio signal, and integrate it over a period of time to generate a relative gain signal. The relative gain signal may be transmitted by the level detector 228 to the filters 230 as a control signal. The analog telematics source 206 may transmit an analog telematics audio signal to the A/D converter 224. The A/D converter 224 converts the analog telematics audio signal to a digital telematics audio signal, and transmits the digital telematics audio signal to the filters 230.

The digital telematics source 208 transmits a digital telematics audio signal directly to the filters 230. The analog and digital telematics audio signals may each be a monophonic, stereophonic, or multi-channel signal, but are preferably monophonic or stereophonic. The analog telematics source 206 and the digital telematics source 208 also may each transmit a switching control signal to the filters 230. For example, the switching control signals may be level signals that are low when the telematics sources 206 and 208 are not transmitting audio signals and high when they are transmitting audio signals.

The filters 230 may generate a digital seatback audio signal as a function of incoming audio and control signals. The D/A converter 232 converts the digital seatback audio signal to an analog seatback audio signal. The analog seatback audio signal is sent to the amplifier 238, which amplifies the signal to drive the seatback speakers 218 and 220.

In operation, seatback audio may be selected by the switching control signals sent from the analog and the digital telematics sources 206 and 208 to the filters 230. For example, the switching control signals may each be at a logic low when the telematics sources 206 and 208 are not transmitting audio signals and at a logic high when they are transmitting audio signals. When the switching control signals are each at a logic low, indicating that the telematics sources 206 and 208 are inactive, the filters 230 may send digital entertainment audio from the switching matrix 226 to the D/A converter 232. The D/A converter 232 and the amplifier 234 convert and amplify the entertainment audio for reproduction by the seatback speakers 218 and 220.

When one of the switching control signals is at the logic high, however, the filters 230 may send the telematics audio from the respective telematics audio sources 206 or 208 to the D/A converter 232. The telematics audio signals may be sent to the exclusion of the digital entertainment audio from the switching matrix 226. Consequently, a vehicle passenger in the seat having seatback speakers 218 and 220 will hear the telematics audio more clearly.

Alternatively, the filters 230 may detect that the telematics sources 206 and 208 are active or inactive by determining whether telematics audio signals received are above or below a threshold signal level, respectively. When both of the telematics sources 206 and 208 are inactive, the filters 230 may send digital entertainment audio from the switching matrix 226 to the D/A converter 232. When one of the telematics sources 206 and 208 is active, however, the filters 230 may send the telematics audio from the respective telematics audio sources 206 or 208 to the D/A converter 232.

Figure 4:
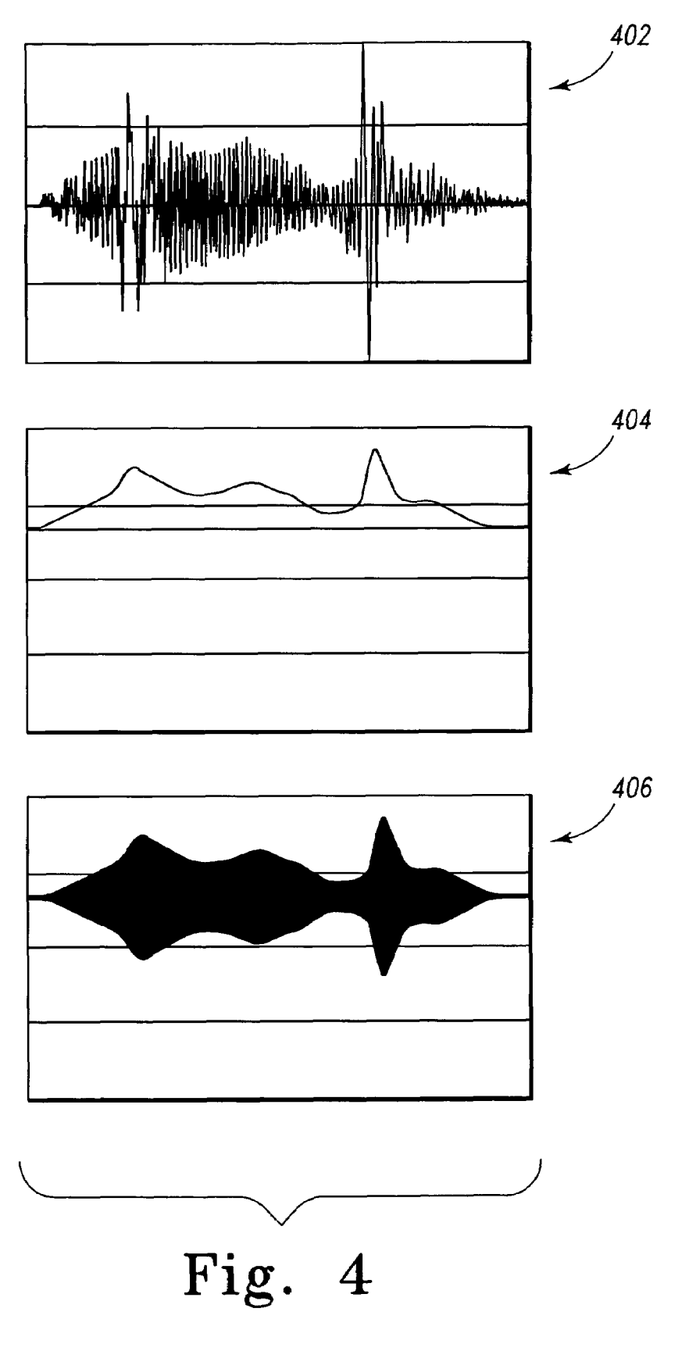
FIG. 4 shows graphs of signals received or generated by a seatback audio controller.

To enhance the intelligibility of the telematics audio, the second illustrative seatback audio controller 210 may modify the telematics audio to overcome entertainment audio playing on vehicle speakers 212 and 214. Graph 402 in FIG. 4 shows an illustrative entertainment audio signal sent from the switching matrix 226 to the level detector 228. The level detector 228 may rectify and integrate the noise signal to generate an average gain signal shown in graph 404, or some other gain signal as a function of the entertainment audio frequency and level. For example, graph 406 of FIG. 4 shows a telematics signal having an output level adjusted through a function of the average gain signal. This amplitude adjustment of the telematics signal increases intelligibility of telematics audio produced by the seatback speakers, 218 and 220 without substantially disturbing the sound heard by other listeners.

Third Seatback Audio Controller

Figure 3:
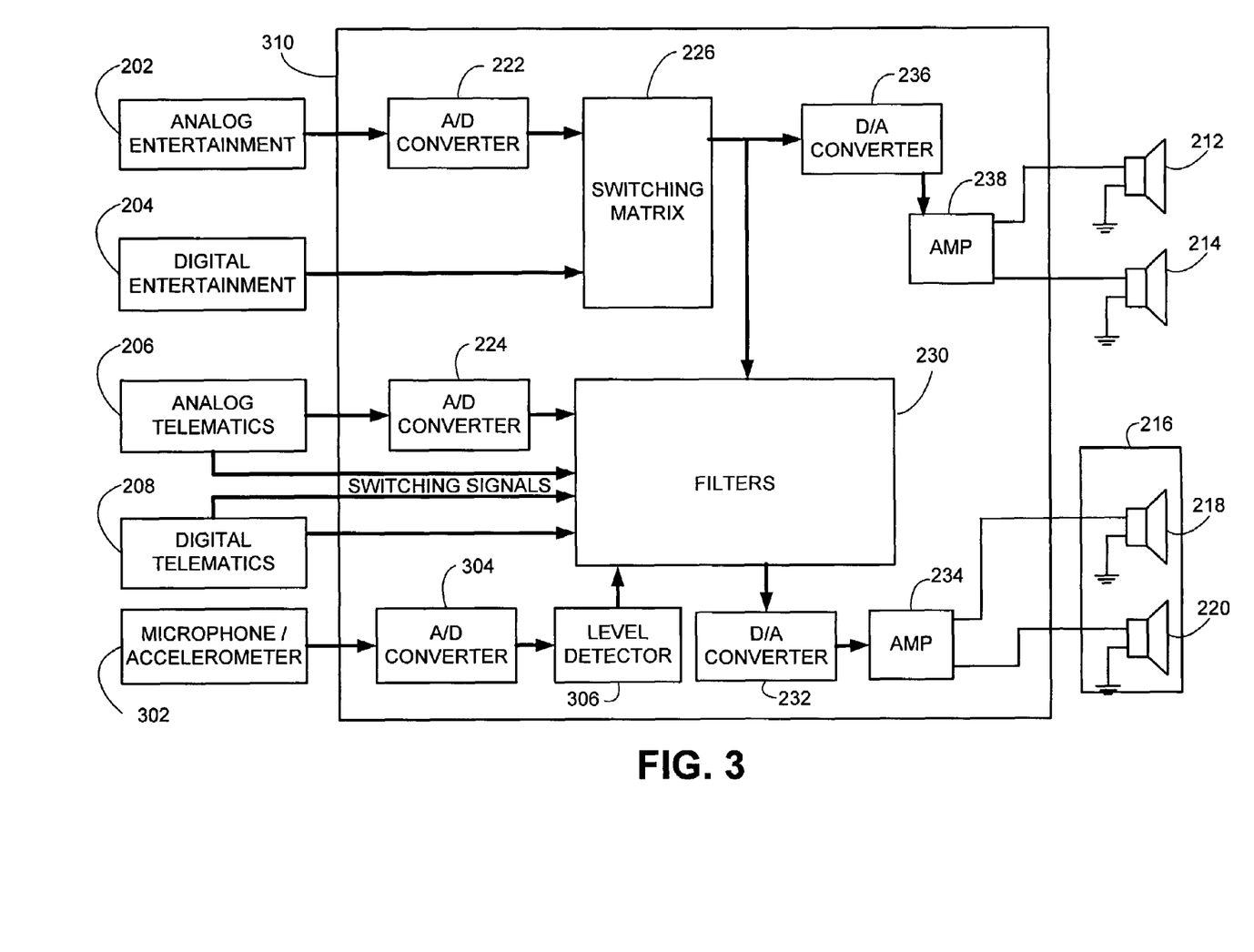
FIG. 3 is a third seatback audio controller connected to multiple sources and multiple speakers.

A third illustrative seatback audio controller 310 is shown in FIG. 3. The seatback audio controller 310 may be configured to accept input signals from an analog entertainment source 302, from a digital entertainment source 304, from an analog telematics source 206, and/or from a digital telematics source 208 in the same manner as the seatback audio controller 210. Additionally, the seatback audio controller 310 may be configured to accept input signals from a transducer, a microphone, or an accelerometer 302.

For example, a microphone 302 may be included in the passenger compartment of a vehicle. The microphone 302 may receive sound generated by the vehicle speakers 212 and 214, such as entertainment audio, as well as sound generated by passengers in the vehicle, the vehicle's engine, and the like. Similarly, an accelerometer 302 may detect vehicle vibrations, or oscillating signals, such as engine vibrations, as well as low frequencies generated by the vehicle speakers 212 and 214, passengers, or air passing the vehicle. In this illustration, a signal generated by a microphone or an accelerometer 302 is a noise signal or a vibration signal.

In operation, seatback audio may be selected by the switching control signals sent from the analog and digital telematics sources 206 and 208 to the filters 230. To enhance the intelligibility of the telematics audio, the third illustrative seatback audio controller 310 may modify the telematics audio to overcome noise. Graph 402 in FIG. 4 shows an illustrative noise signal with respect to time generated by the microphone or an accelerometer 302, and transmitted to the A/D converter 304. The A/D converter 304 converts this analog noise signal into a digital noise signal, and transmits the digital noise signal to the level detector 306.

The level detector 228 may rectify and integrate the noise signal to generate an average gain signal shown in graph 404, or some other gain signal as a function of noise frequency and level. For example, graph 406 of FIG. 4 shows a telematics signal having an output level adjusted as a function of the average gain signal. This level adjustment of the telematics signal increases intelligibility of telematics audio produced by the seatback speakers, 218 and 220 without disturbing other listeners.

Additionally, the filters 230 of the second or third illustrative seatback audio controllers 210 and 310 may also modify the entertainment audio signals received from the switching matrix 226 to enhance a listener's experience. For example, the filters 230 may be configured to implement head-related transfer functions. Auditory spatial impression cues may determine how listeners localize sound. Head-related transfer functions may provide spectral modification on incoming sound to a listener's ears, and produce a unique frequency response at each ear for a given sound-source position near a listener. To produce auditory spatial impression cues it may be desirable to adjust head-related transfer functions and inter-aural levels, as well as amplitude differences between the ears.

The term "coupled" is intended to broadly encompass both direct and indirect coupling. A first part and a second part are coupled together when they are directly connected, as well as when the first part is connected to an intermediate part or parts which connect to the second part.

The term "vehicle speaker" is intended to broadly encompass a device that converts input energy of one form into output energy of another. The "vehicle speaker" described above converts electric energy to non-electric energy. A vehicle speaker need not be coupled to a seat. For example, the vehicle speakers 212 and 214 of FIG. 2, may be mounted in a dash or a rear deck of an automobile, and the seat 216 may be a driver's seat.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A vehicle seatback audio controller, comprising:
a first input configured to receive an entertainment audio signal from an entertainment audio source;
a second input configured to receive a telematics audio signal from a telematics audio source;
a level detector electrically coupled to the first input;
a signal processor electrically coupled to the first input, the second input, the level detector, and a seatback speaker, the seatback speaker coupled to a seat of a vehicle;
where the signal processor provides the telematics audio signal to the seatback speaker when the telematics audio source is active, and provides the entertainment audio signal to the seatback speaker when the telematics audio source is inactive;
where a vehicle speaker receives an amplified signal of the entertainment audio signal while the telematics audio source is either inactive or active;
where telematics audio from the seatback speaker is directed to a first listener position in the seat, entertainment audio from the vehicle speaker is directed to the first listener position and a second listener position located elsewhere in the vehicle, and the telematics audio from the seatback speaker and the entertainment audio from the vehicle speaker are produced in a common listener space within the vehicle;
where the level detector determines an average gain signal as a function of the entertainment audio signal; and
where the signal processor adjusts a level of the telematics audio signal to the seatback speaker as a function of the average gain signal.

2. The vehicle seatback audio controller of claim 1, where the signal processor determines whether the telematics audio source is active from the telematics audio signal.

3. The vehicle seatback audio controller of claim 1, further comprising a third input configured to receive a control signal from the telematics audio source, where the signal processor determines whether the telematics audio source is active from the control signal.

4. The vehicle seatback audio controller of claim 1, where the telematics audio source comprises a radar warning system.

5. The vehicle seatback audio controller of claim 1, where the telematics audio source comprises a navigation system.

6. The vehicle seatback audio controller of claim 1, where the telematics audio source comprises a mobile telephone.

7. The vehicle seatback audio controller of claim 1, where the entertainment audio source provides a digital audio signal.

8. The vehicle seatback audio controller of claim 1, where the entertainment audio source comprises a compact disc player.

9. The vehicle seatback audio controller of claim 1, where the level detector rectifies the entertainment audio signal to generate a rectified signal and integrates the rectified signal to determine the average gain signal.

10. A method of controlling seatback audio, comprising:
receiving an entertainment audio signal from an entertainment audio source;
receiving a telematics audio signal from a telematics audio source;
providing the telematics audio signal to a seatback speaker when the telematics audio source is active, where the seatback speaker is coupled to a seat;
providing the entertainment audio signal to the seatback speaker when the telematics audio source is inactive;
providing the entertainment audio signal to a vehicle speaker regardless of whether the telematics audio source is active; and
adjusting a level of the telematics audio signal to the seatback speaker as a function of the entertainment audio signal, where telematics audio produced by the seatback speaker and entertainment audio produced by the vehicle speaker are produced in a common listener space, and the common listener space includes a first listener position located in the seat and a second listener position located elsewhere in the vehicle.

11. The method of claim 10, where adjusting the level of the telematics audio signal includes:
receiving a vibration signal from an accelerometer positioned in a vehicle;
determining an average gain signal as a function of the entertainment audio signal and the vibration signal; and
adjusting the level of the telematics audio signal to the seatback speaker as a function of the average gain signal.

12. The method of claim 10, where adjusting the level of the telematics audio signal includes:
receiving a vibration signal from a microphone positioned in a vehicle, where the microphone receives sounds produced by the vehicle speaker;
determining gain signal as a function of the entertainment audio and the vibration signal; and
adjusting the level of the telematics audio signal to the seatback speaker as a function of the gain signal.

13. The method of claim 10, where adjusting the level of the telematics audio signal includes:
generating a rectified signal from the entertainment audio signal;
integrating the rectified signal to generate an average gain signal; and
adjusting the level of the telematics audio signal to the seatback speaker as a function of the average gain signal.

14. The method of claim 10, further comprising determining whether the telematics audio source is active based on whether the telematics audio signal received is above a threshold signal level.

15. A vehicle seatback audio controller, comprising:
means for receiving an entertainment audio signal;
means for receiving a telematics audio signal;
a signal processor configured to transmit the telematics audio signal to a seatback speaker when the telematics audio signal is active and to transmit;
the entertainment audio signal to the seatback speaker when the telematics audio signal is inactive, where the seatback speaker is coupled to a seat of a vehicle, where the signal processor is also configured to adjust an amplitude of the telematics audio signal transmitted to the seatback speaker, where adjustment of the amplitude is based on the entertainment audio signal, where a vehicle speaker in the vehicle is configured to receive an amplified entertainment audio signal independent of whether the telematics audio signal is active, and where telematics audio produced by the seatback speaker and entertainment audio produced by the vehicle sneaker are both produced in a common listener space within the vehicle.

16. The vehicle seatback audio controller of claim 15, comprising:
a microphone positioned in the vehicle, where the microphone is configured to generate a noise signal from audio received by the microphone, and the audio includes the entertainment audio produced by the vehicle speaker; and
a level detector coupled to the microphone, where the level detector is configured to receive the noise signal, the level detector determines an average gain signal as a function of the noise signal, and the signal processor is configured to increase the amplitude as a function of the average gain signal.

17. The vehicle seatback audio controller of claim 15, comprising:
an accelerometer coupled to the vehicle, where the accelerometer is configured to generate a vibration signal; and
a level detector coupled to the accelerometer, where the level detector is configured to receive the vibration signal and the entertainment audio signal, the level detector is configured to determine an average gain signal as a function of the vibration signal and the entertainment audio signal, and the signal processor is configured to adjust the amplitude of the telematics audio signal to the seatback speaker as a function of the average gain signal.

18. The vehicle seatback audio controller of claim 15, comprising a level detector coupled to the signal processor, where the level detector is configured to determine an average gain signal as a function of the entertainment audio signal, and the signal processor is configured to adjust the amplitude of the telematics audio signal transmitted to the seatback speaker as a function of the average gain signal.

19. A vehicle seatback audio controller, comprising:
a filter;
a level detector electrically coupled to the filter;
where the filter is configured to receive an entertainment audio signal from an entertainment audio source, and the filter is also configured to receive a telematics audio signal from a telematics audio source;
where the filter is configured to provide an output signal to a seatback speaker, and the seatback speaker is coupled to a seat of a vehicle;
where the filter is configured to provide the telematics audio signal as the output signal in response to the telematics audio source determined to be active, and is further configured to provide the entertainment audio signal as the output signal in response to the telematics audio source determined to be inactive;
where a vehicle speaker in the vehicle is configured to receive an amplified signal of the entertainment audio signal independently of whether the telematics audio source is active;
where entertainment audio produced by the vehicle speaker and telematics audio produced by the seatback speaker are produced in a common listener space within the vehicle;
where the level detector is configured to generate an average gain signal from the entertainment audio signal; and where the filter amplifies the telematics audio signal provided to the output signal based on the average gain signal.

20. The vehicle seatback audio controller of claim 19, where the filter comprises a digital signal processor.

21. The vehicle seatback audio controller of claim 19, where the level detector is configured to generate a rectified signal from the entertainment audio signal and is also configured to integrate the rectified signal to generate the average gain signal.

22. The vehicle seatback audio controller of claim 19, where the telematics audio source comprises a mobile telephone.

23. The vehicle seatback audio controller of claim 19, where the filter is configured to determine whether the telematics audio source is active from the telematics audio signal.

24. The vehicle seatback audio controller of claim 19, where amplification of the telematics audio signal increases the intelligibility of the telematics audio produced by the seatback speaker and received at a listener position in the seat without substantially disturbing the entertainment audio produced by the vehicle speaker and received at another listener position located elsewhere in the vehicle.

* * * * *

UNITED STATES PATENT AND TRADEMARK OFFICE
CERTIFICATE OF CORRECTION

| | | |
|---|---|---|
| PATENT NO. | : 7,466,832 B2 | Page 1 of 1 |
| APPLICATION NO. | : 10/631187 | |
| DATED | : December 16, 2008 | |
| INVENTOR(S) | : William Neal House | |

It is certified that error appears in the above-identified patent and that said Letters Patent is hereby corrected as shown below:

<u>Column 8</u>

Line 1, delete "sneaker" and insert --speaker--

Signed and Sealed this

Twenty-fourth Day of February, 2009

JOHN DOLL
*Acting Director of the United States Patent and Trademark Office*